United States Patent [19]
Sebastian

[11] Patent Number: 5,718,192
[45] Date of Patent: Feb. 17, 1998

[54] LEASH AND ATTACHED CARRYING BAG

[76] Inventor: Arlin Sebastian, 57 Lovett St., Suite No. 1, Beverly, Mass. 01915

[21] Appl. No.: 667,736

[22] Filed: Jun. 21, 1996

[51] Int. Cl.$^6$ ..................................................... A01K 27/00
[52] U.S. Cl. ............................................ 119/795; 224/240
[58] Field of Search ................................. 119/792, 795, 119/797, 858; 224/236, 240, 663, 665, 681

[56] References Cited

U.S. PATENT DOCUMENTS

| | | | |
|---|---|---|---|
| 1,648,565 | 11/1927 | Primley | 224/681 X |
| 4,893,739 | 1/1990 | Conner | 224/240 |
| 4,998,653 | 3/1991 | LaBelle | 224/240 X |
| 5,233,942 | 8/1993 | Cooper et al. | 224/240 X |
| 5,560,321 | 10/1996 | Hess | 119/858 |

*Primary Examiner*—Robert P. Swiatek
*Attorney, Agent, or Firm*—Scott B. Garrison

[57] ABSTRACT

An animal waste carrying bag and leash for carrying articles such as pet waste, waste retrieval articles, bags, and personal belongings. The carrying bag may be attached to the pet leash or carried by hand. A name plate on the carrying bag provides identification of the owner and a fluorescent strip on the carrying bag provides for safer walking at night. The apparatus allows for a cleaner, more dignified way of transporting pet waste.

4 Claims, 3 Drawing Sheets

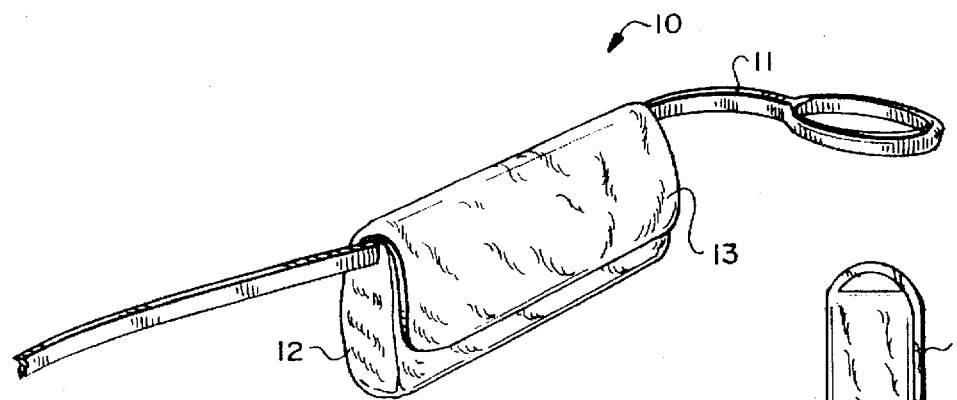
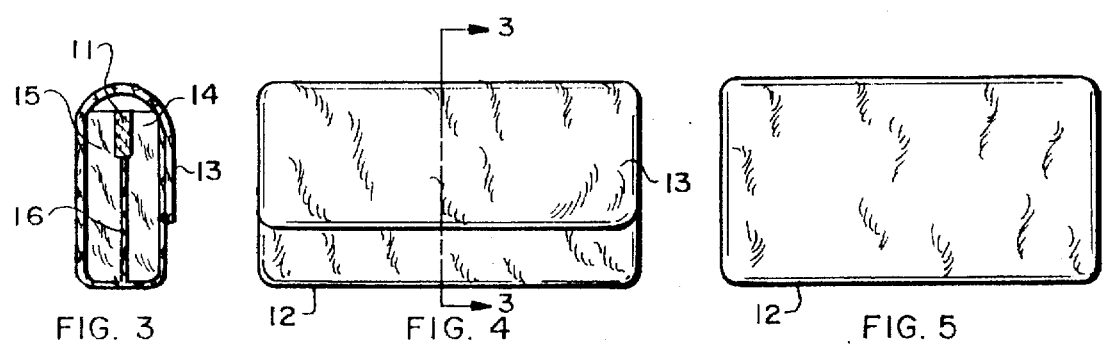
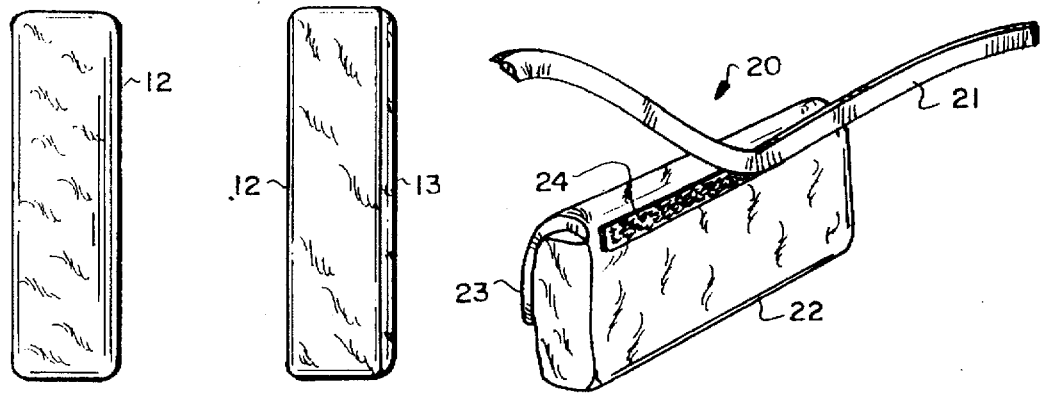

5,718,192

1
LEASH AND ATTACHED CARRYING BAG

BACKGROUND OF THE INVENTION

The present invention relates to the field of pet leashes. More particularly, it relates to an improved system wherein a pet owner can maintain control over his or her pet by carrying a leash but the owner can also retrieve and retain the pet's waste in a convenient storage bag attached to said leash. This invention is especially well-suited to dog owners, especially those residing within cities.

Dog owners are required by law in many cities to retrieve their pet's waste from the ground, sidewalk, or street and to dispose of it in an appropriate trash receptacle. There are known devices for both retrieval and disposal on the market. The major disadvantage of such devices is that they must be carried by the pet owner. This is a problem because not only are these devices unsightly and noisome, but they also tie up the use of at least one of the pet owner's hands.

SUMMARY OF THE INVENTION

This invention proposes a solution to the above-referenced problem. One embodiment of the present invention relates to a carrying bag which may be attached to a simple leash or rope, however, the bag alternatively may be carried by the owner if desired. Another embodiment comprises a correspondingly similar bag which differs in that it is permanently affixed to a leash. The shape of the carrying bag in either embodiment is envisioned as being in any number of configurations including a typical square bag as well as a more artistic version in the shape of an animal, such as a dog.

The invention can also be provided with a single pocket for carrying the animal's waste or alternatively a plurality of pockets separate from a waste pocket. These additional pockets can carry other items such as identification, keys, wallet, pet treats, etc. Additionally some means must be included which enables the owner to pick up the animal's waste. This item could be a scoop or small shovel and could be stored in the waste compartment or another compartment. This scoop or shovel does not form a part of the present invention, however it is a desirable supplement and should have a dedicated space provided for its storage. The same holds true for a disposable storage bag which could be a simple plastic bag designed for the purpose.

The bag, and the leash and bag combination can come in an assortment of colors to increase marketability and it might also be desirable to incorporate a fluorescent element into the device such that the pet and pet owner are more visible at night. It is also contemplated that the device be capable of personalization in that space is provided so that the pet's name or other information can be displayed on the carrying bag for instance by the use of an engraveable name plate.

It is therefore an object of this invention to provide a pet leash capable of additionally storing a pet's waste thereby eliminating the need for the pet owner to tie up the use of his or her spare hand.

Another important object of the present invention is to provide a discrete container for carrying pet waste as well as retrieval and disposal articles for pet waste.

Still another object of the present invention is to provide additional storage space in which a pet owner can carry personal belongings deemed desirable to possess while walking one's pet, such as keys, wallet, pepper spray, identification, extra plastic bags, etc.

2

Another objective of this invention is to maintain the pet owner's sense of dignity as she performs her responsibilities of cleaning up after her pet.

An additional objective is to provide an inexpensive item which alleviates the owner's need to remember to carry a pet waste container because the device is incorporated into the pet leash.

A further objective of the present invention is to provide a location on the device capable of personalization either prior to purchase or alternatively by the pet owner post purchase.

Yet another objective of the present invention is to provide the device in a wide array of colors and shapes to please a potential consumer.

Still another objective of the present invention is to provide the device in fluorescent colors to increase visibility of the device at night.

BRIEF DESCRIPTION OF THE DRAWINGS

The novel features considered characteristic of the invention are set forth in the appended claims. The invention itself, however, both as to its construction and its method of operation, together with additional objects and advantages thereof, will best be understood from the following description of the specific embodiments when read and understood in connection with the accompanying drawings.

FIG. 1 is a front, three quarter elevation view of the carrying bag and leash of the present invention further depicting an area for a pet's name or other information;

FIG. 2 is an end view of the FIG. 1 embodiment without the leash;

FIG. 3 is a cross-sectional view of the FIG. 1 embodiment taken through line 3—3 of FIG. 4, depicting two compartments separated by a partition;

FIG. 4 is a front elevation of the FIG. 1 embodiment;

FIG. 5 is a rear elevation of the FIG. 1 embodiment;

FIG. 6 is a top plan view of the FIG. 1 embodiment;

FIG. 7 is a bottom plan view of the FIG. 1 embodiment;

FIG. 8 is a rear, three quarter elevation view of an alternative embodiment depicting a carrying bag which is attachable to a leash by hook and loop type fasteners;

DETAILED DESCRIPTION OF THE PREFERRED EMBODIMENTS

Figure 9:
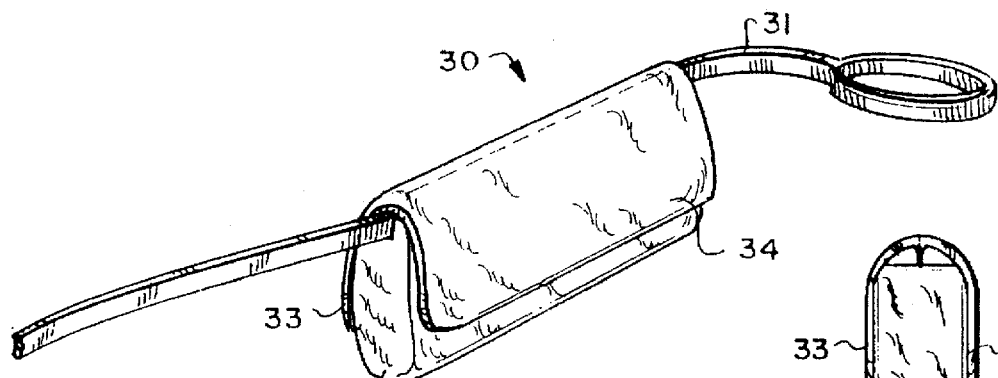
FIG. 9 is a front, three quarter elevation view of another embodiment having two flaps.
Figure 10:
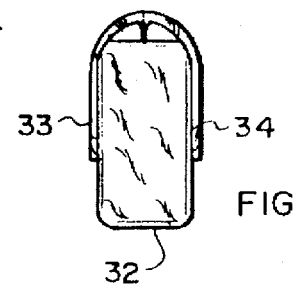
FIG. 10 is an end view of the FIG. 9 embodiment without the leash.
Figure 11:
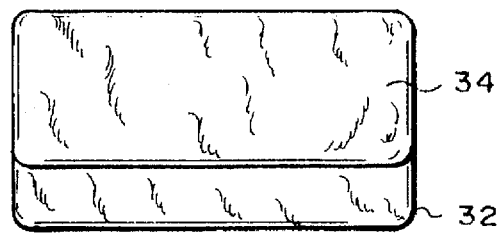
FIG. 11 is aから elevation of the FIG. 9 embodiment.
Figure 12:
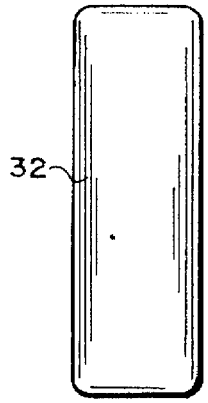
FIG. 12 is a top plan view of the FIG. 9 embodiment.
Figure 13:
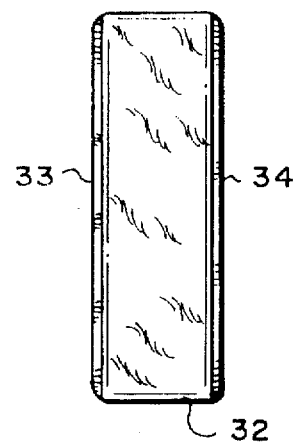
FIG. 13 is a bottom plan view of the FIG. 9 embodiment.

With reference to FIGS. 1, 10 depicts a carrying bag and leash generally. 11 depicts a portion of a leash to which carrying bag 12 is fastened. Carrying bag 12 can be permanently affixed to the leash or detachable to enable it to be removed from the leash in order to accommodate cleaning. 13 is a flap integral to bag 12 which enables a pet owner to close bag 12 thereby concealing its contents from view. FIG. 3 depicts a cross-section through the bag which shows two compartments 14 and 15 separated by partition 16. Although the invention contemplates a single compartment, having more than one compartment is preferred by the applicant in that partition 16 further isolates any pet waste stored within one compartment from personal belongings stored within another compartment. As such, a multiplicity of compartments can be provided so long as there is at least one compartment dedicated to the storage of waste.

FIG. 8 depicts an alternative embodiment 20 of a bag 22 having a flap 23 and which attaches to leash 21 by a fastening means, such as snaps, a pocket through which the leash is threaded, or as in this case a hook and loop type fastener 24. FIGS. 9–13 depict another embodiment 30 of a bag 32 which attaches to leash 31 and which bag has two flaps 33, 34, one to cover each compartment.

Figure 14:
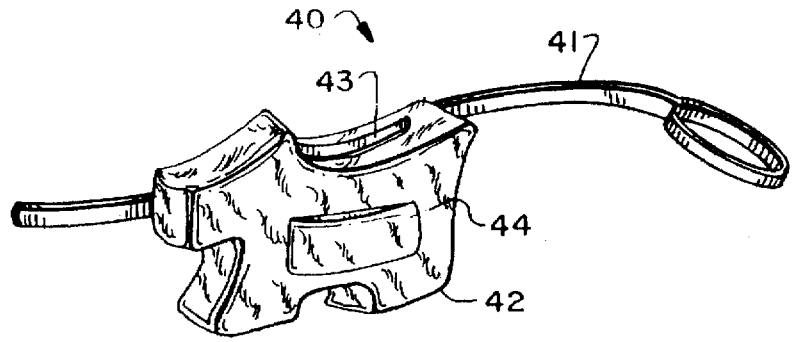
FIG. 14 is a front, three quarter elevation view of another embodiment depicting a carrying bag in the shape of an animal, in this case a dog.
Figure 15:
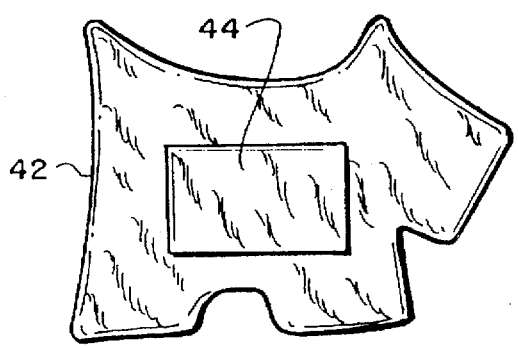
FIG. 15 is a front elevation of the FIG. 14 embodiment without the leash depicting an external pocket.
Figure 16:
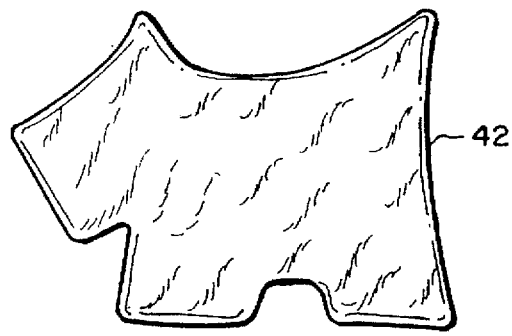
FIG. 16 is a rear elevation of the FIG. 14 embodiment.
Figure 17:
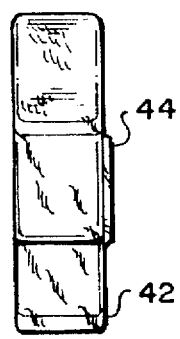
FIG. 17 is an end view of the FIG. 14 embodiment looking from right end to left end.
Figure 18:
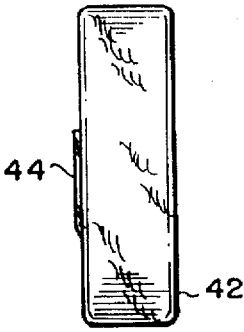
FIG. 18 is an end view of the FIG. 14 embodiment looking from left end to right end.
Figure 19:
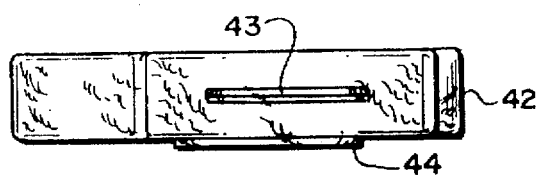
FIG. 19 is a top view of the FIG. 14 embodiment looking downward.
Figure 20:
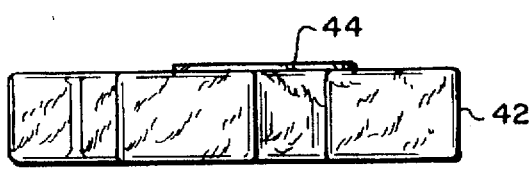
FIG. 20 is a bottom view of the FIG. 14 embodiment looking upward.

FIGS. 14–20 depicts an embodiment 40 of carrying bag 42 and leash 41 in which carrying bag 42 is in the shape of an animal, in this case a dog. 43 refers to a slit pocket in the top of bag 42. Slit pocket 43 is an alternative means of sealing the compartment. Slit pocket 43 can be sealed by any number of means, including a zipper, hook and loop fasteners, snaps, buttons, or the like. FIGS. 14 and 15 also show an external pocket 44 located on bag 42, a single pocket or a plurality of pockets provide additional storage space for the pet owners personal effects can be provided.

Each of the above embodiments describes several configurations and variations of the same. However, the invention, although it may have an infinite number of design configurations possesses certain recurring characteristics. The characteristics that define the invention are: that the carrying bag be attachable to a leash by some attachment means, that the carrying bag have a dedicated compartment for the storage of animal waste; and that the carrying bag is to be made of a durable, washable material. Other features that are preferred but not necessary are: that the carrying bag have a plurality of compartments wherein at least one such compartment is dedicated to animal waste storage, that at least the waste storage compartment is capable of being isolated from any other compartment as well as the environment by a closure means such as a flap or closeable slit, and that the carrying bag and leash have some indicia means capable of being visible to others at night.

More specifically, it is envisioned that the carrying bag be attached to the leash by any number of attachment means suitable for the purpose, some such means being permanent stitching, hook and loop type fasteners, snaps, buttons, zippers, capturing the leash within a loop of material located upon the carrying bag specifically designed to receive the leash, or other similar methods. Similar methods of sealing the closure means are envisioned. For instance hook and loop type fasteners, zippers, buttons, snaps, etc. would accomplish the purpose of isolating the waste storage compartment from other compartments as well as the environment. The invention also contemplates the use of some form of indicia capable of being visible at night. The preferred means of accomplishing this is to provide a fluorescent element to the invention, however other elements such as lights could accomplish the same purpose. In the case of a fluorescent element, a patch or sticker affixed to the carrying bag or leash could be used. Alternatively, the leash itself could contain a fluorescent strand of rope as one of the braids in the case of a braided rope leash.

To increase consumer desirability of the invention, it is contemplated that at least the carrying bag be capable of personalization. As such, a name plate could be provided on the carrying bag. This name plate could even incorporate the aforementioned fluorescent features. Additional internal compartments or pockets could be incorporated into the carrying bag to provide space for the pet or pet owner's belongings. Furthermore, the carrying bag could be manufactured from material that comes in an assortment of colors, such as fabric or plastic. Different color schemes could be used which would appeal to various consumers.

The methods of making and using the device detailed above constitute the inventor's preferred embodiments to the invention. The inventor is aware that numerous configurations are available which also provide the desired results. While the invention has been described and illustrated with reference to these specific embodiments, it is understood that other embodiments may be resorted to without departing from the invention. Therefore the form of the invention set out above should be considered illustrative and not as limiting the scope of the following claims.

What is claimed is:

1. An animal waste carrying bag attachable to a pet leash comprising:

a bag portion having a width and a length, said length being at least twice said width, said bag portion further comprising a durable, washable material, said bag portion further having a partition, said partition running the length of said bag portion and dividing the width of said bag portion into two approximately equally sized non-communicating compartments;

a leash spatially coincident with and closely adjacent to said partition for attaching the bag portion directly to said leash; and at least one flap for covering said compartments.

2. The animal waste carrying bag of claim 1 wherein there are two flaps, each attachably originating at an upper edge of said partition and each covering one of said compartments.

3. The animal waste carrying bag of claim 2 wherein said leash is permanently affixed to said bag portion.

4. The animal waste carrying bag of claim 3 wherein said leash is located substantially toward the leash's handle portion.

* * * * *